US009503917B2

(12) United States Patent
Lee et al.

(10) Patent No.: US 9,503,917 B2
(45) Date of Patent: Nov. 22, 2016

(54) METHODS FOR MITIGATING INTERFERENCE IN A COMMUNICATIONS APPARATUS AND COMMUNICATIONS APPARATUS UTILIZING THE SAME

(71) Applicant: MediaTek Inc., Hsin-Chu (TW)

(72) Inventors: Chi-Chen Lee, Taipei (TW); Yi-Chun Wei, Hsinchu (TW); Hung-Wei Shih, New Taipei (TW); Yi-Jung Chiang, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 235 days.

(21) Appl. No.: 14/258,225

(22) Filed: Apr. 22, 2014

(65) Prior Publication Data

US 2014/0314008 A1    Oct. 23, 2014

Related U.S. Application Data

(60) Provisional application No. 61/814,961, filed on Apr. 23, 2013.

(51) Int. Cl.
*H04W 24/02* (2009.01)
*H04W 88/06* (2009.01)
*H04W 52/24* (2009.01)

(52) U.S. Cl.
CPC ............ *H04W 24/02* (2013.01); *H04W 88/06* (2013.01); *H04W 52/24* (2013.01); *H04W 52/243* (2013.01)

(58) Field of Classification Search
CPC ........... H04W 88/06; H04W 52/0238; H04W 52/24; H04W 52/243; H04W 52/244; H04W 24/02
See application file for complete search history.

(56) References Cited

U.S. PATENT DOCUMENTS

| 2012/0088455 A1* | 4/2012 | Love | H04W 52/243 |
| | | | 455/67.11 |
| 2013/0044791 A1 | 2/2013 | Rimini et al. | |
| 2013/0231147 A1* | 9/2013 | Li | H04B 1/005 |
| | | | 455/501 |

FOREIGN PATENT DOCUMENTS

| WO | WO 2012/021879 | 2/2012 |
| WO | WO 2012/061765 | 5/2012 |

* cited by examiner

*Primary Examiner* — Paul H Masur
*Assistant Examiner* — Kabir Jahangir
(74) *Attorney, Agent, or Firm* — McClure, Qualey & Rodack, LLP (57) ABSTRACT

A communications apparatus includes at least two cellular system radio transceivers capable of simultaneously performing transmitting/receiving radio activities in two cellular networks and a control entity. The control entity is coupled to the cellular system radio transceivers, collects radio activity information of the cellular system radio transceivers, determines whether interference will occur or is occurring and which cellular system radio transceiver is an aggressor transceiver and which cellular system radio transceiver is a victim transceiver when the interference occurs according to the radio activity information, and further determines control information according to the radio activity information for controlling the aggressor transceiver or the victim transceiver to mitigate the interference. The aggressor transceiver is the cellular system radio transceiver having the transmitting radio activity that will interfere or interferes with the receiving radio activity of the victim transceiver.

23 Claims, 9 Drawing Sheets

METHODS FOR MITIGATING INTERFERENCE IN A COMMUNICATIONS APPARATUS AND COMMUNICATIONS APPARATUS UTILIZING THE SAME

CROSS REFERENCE TO RELATED APPLICATIONS

This application claims the benefit of U.S. Provisional Application No. 61/814,961 filed 2013 Apr. 23 and entitled "Method and apparatus to reduce or avoid dual talk interference". The entire contents of which are hereby incorporated by reference.

BACKGROUND OF THE INVENTION

Field of the Invention

The invention relates to methods for mitigating interference occurring in a communications apparatus.

Description of the Related Art

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations worldwide. They can be used anywhere, as long as there is a cellular telephone site to house equipment that can transmit and receive signals, which are processed to transfer both voice and data to and from the cellular telephones.

There are various well-developed and well-defined cellular communications radio access technologies (RATs). For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. Wireless Fidelity (Wi-Fi) is a technology defined by the 802.11 engineering standard and can be used for home networks, mobile phones, and video games, to provide a high-frequency wireless local area network. The LTE (Long Term Evolution) and the LTE-Advanced evolved from the LTE are the 4G mobile communications systems, which provide high-speed data transmission over 2G and 3G systems.

BRIEF SUMMARY OF THE INVENTION

Communications apparatuses and methods for mitigating interference occurring in a communications apparatus are provided. An exemplary embodiment of a communications apparatus comprises at least two cellular system radio transceivers capable of simultaneously performing transmitting/receiving radio activities in two cellular networks and a control entity. The control entity is coupled to the cellular system radio transceivers, collects radio activity information of the cellular system radio transceivers, determines whether interference will occur or is occurring and which cellular system radio transceiver is an aggressor transceiver and which cellular system radio transceiver is a victim transceiver when the interference occurs according to the radio activity information. The control entity further determines control information according to the radio activity information for controlling the aggressor transceiver or the victim transceiver to mitigate the interference. The aggressor transceiver is the cellular system radio transceiver having the transmitting radio activity that will interfere or interferes with the receiving radio activity of the victim transceiver.

An exemplary embodiment of a method for mitigating interference occurred in a communications apparatus comprising at least two cellular system radio transceivers capable of simultaneously performing transmitting/receiving radio activities in two cellular networks is provided. The method comprises: collecting radio activity information of the cellular system radio transceivers; determining whether interference will occur or is occurring and which cellular system radio transceiver is an aggressor transceiver and which cellular system radio transceiver is a victim transceiver when the interference occurs according to the radio activity information; and determining control information according to the radio activity information for controlling the aggressor transceiver or the victim transceiver to mitigate the interference. The aggressor transceiver is the cellular system radio transceiver having the transmitting radio activity that will interfere or interferes with the receiving radio activity of the victim transceiver.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
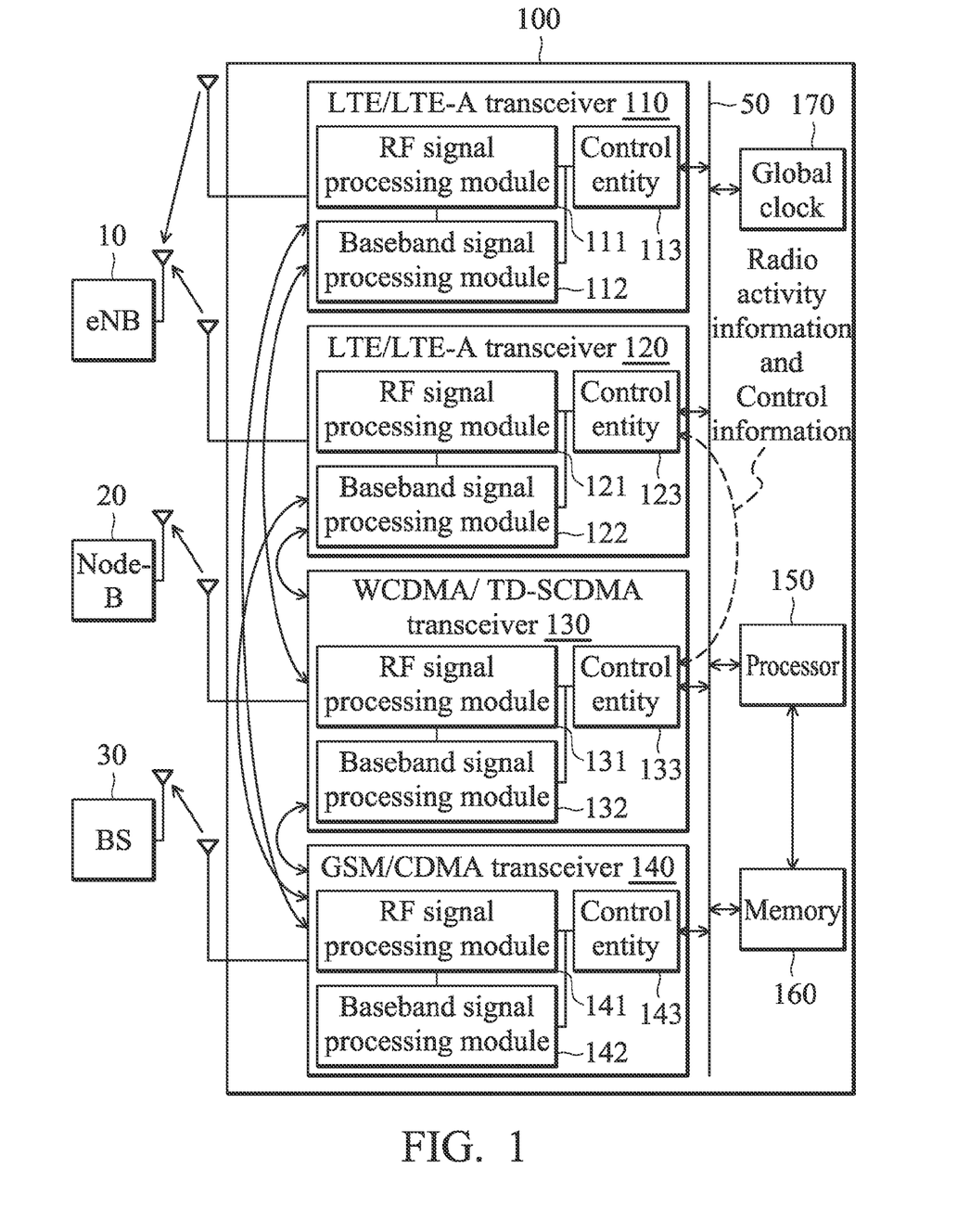
FIG. 1 is a block diagram of a communications apparatus according to an embodiment of the invention.

FIG. 1 shows a simplified block diagram of a communications apparatus according to an embodiment of the invention. The communications apparatus 100 may comprise at least two cellular system radio transceivers capable of simultaneously performing transmitting (TX) and/or receiving (RX) activities in two cellular networks. As shown in FIG. 1, the communications apparatus 100 may comprise LTE/LTE-A transceivers 110 and 120, a wideband CDMA (WCDMA)/Time Division-Synchronous Code Division Multiple Access (TD-SCDMA) transceiver 130 and a GSM/CDMA transceiver 140. Note the RATs (e.g. the LTE, LTE-A, WCDMA, TD-SCDMA, GSM and CDMA) of the cellular system radio transceivers shown in FIG. 1 are merely one of a plurality of embodiments, and the invention should not be limited thereto. In addition, one or more cellular system radio transceivers shown in FIG. 1 may be regarded as a virtual radio transceiver, since depending on different system requirements, one or more elements comprised in the RF signal processing module and the baseband signal processing module of one cellular system radio transceiver may be shared with another cellular system radio transceiver. For example, the LTE/LTE-A transceiver 120 and the WCDMA/WCDMA transceiver 130 may share most of the elements in the RF signal processing module and the baseband signal processing module, and may still operate independently based on different digital signal processing (DSP) algorithms.

Each cellular system radio transceiver may comprise an RF signal processing module (e.g. the RF signal processing module 111, 121, 131 or 141), a baseband signal processing module (e.g. the baseband signal processing module 112, 122, 132 or 142) and a control entity (e.g. the control entity 113, 123, 133 or 143). The RF signal processing module (e.g. the RF signal processing module 111, 121, 131 or 141) may receive RF signals via the antenna and process the received RF signals to convert the received RF signals to baseband signals to be processed by the baseband signal processing module, or receive baseband signals from the baseband signal processing module and convert the received baseband signals to RF signals to be transmitted to a peer communications apparatus. The peer communications apparatus may be, for example but is not limited to, a base station (BS) 30, a node-B 20, an evolved Node-B (eNB) 30, or other such devices in the cellular network. The RF signal processing module may comprise a plurality of hardware elements and firmware/software modules to perform radio frequency conversion and RF signal processing. For example, the RF signal processing module may comprise a power amplifier, a mixer, or others.

The baseband signal processing module (e.g. the baseband signal processing module 112, 122, 132 or 142) may process (for example, decode and demodulate) the baseband signals corresponding to the RF signals processed by the RF signal processing module to obtain information or data transmitted by the peer communications apparatus, such as the system information carried by the peer communications apparatus in the RF signals, and may process (for example, encode and modulate) uplink data to be transmitted to the peer communications apparatus as the baseband signals and provide the baseband signals to the RF signal processing module. The baseband signal processing module may also comprise a plurality of hardware elements and firmware/software modules to perform baseband signal processing. The baseband signal processing may comprise analog-to-digital conversion (ADC)/digital-to-analog conversion (DAC), gain adjustment, modulation/demodulation, encoding/decoding, and so on.

The control entity (e.g. the control entity 113, 123, 133 or 143) may control the operations of the corresponding baseband signal processing module and RF signal processing module so as to control the overall operations of the corresponding cellular system radio transceiver.

The communications apparatus 100 may further comprise a processor 150, a memory 160 and a global clock 170. The processor 150 is connected to the cellular system radio transceivers 110-140, and communicates with the cellular system radio transceivers 110-140 via a predetermined interface 50. The processor 150 may control the operations of the cellular system radio transceivers 110-140. According to an embodiment of the invention, the processor 150 may also be arranged to execute the program codes for device application processing for the communications apparatus 100. The program codes accompanied with specific data in a data structure may also be referred to as a processor logic unit or a stack instance when being executed. Therefore, the processor 150 may be regarded as comprising a plurality of processor logic units, each for executing one or more specific functions or tasks of the corresponding software module(s).

The memory 160 may store system data and user data of the communications apparatus 100. The global clock 170 may be provided as a reference clock for performing timing alignment between two cellular system radio transceivers, since each RAT generally uses different system clocks and different time units.

Note that, in order to clarify the concept of the invention, FIG. 1 presents a simplified block diagram in which only the elements relevant to the invention are shown. However, the invention should not be limited to what is shown in FIG. 1.

Figure 2:
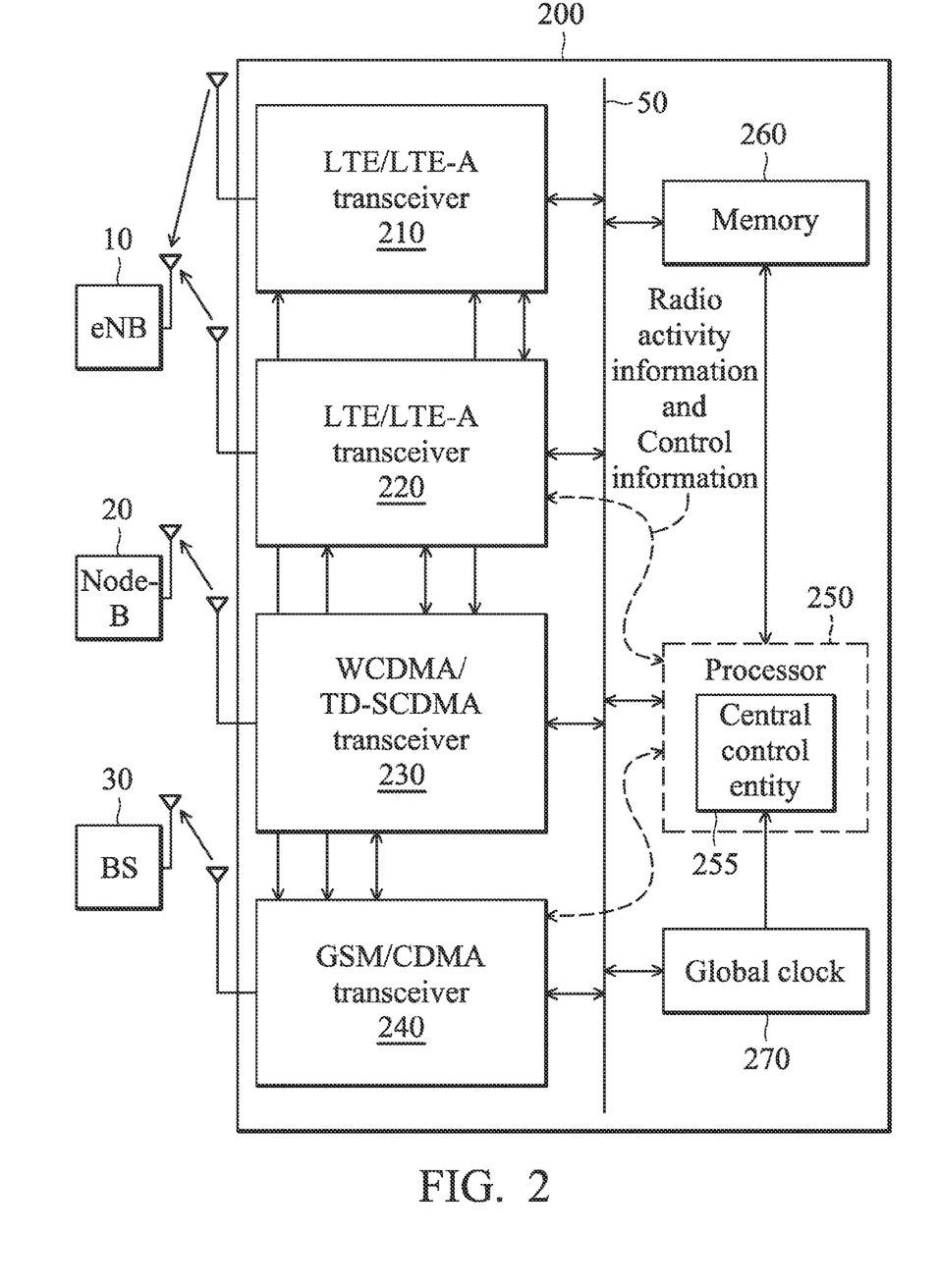
FIG. 2 shows a simplified block diagram of a communications apparatus having a central control entity according to another embodiment of the invention.

FIG. 2 shows a simplified block diagram of a communications apparatus having a central control entity according to another embodiment of the invention. The communications apparatus 200 may comprise at least two cellular system radio transceivers capable of simultaneously performing transmitting (TX) and/or receiving (RX) activities in two cellular networks. As shown in FIG. 2, the communications apparatus 200 may comprise LTE/LTE-A transceivers 210 and 120, a wideband CDMA (WCDMA)/Time Division-Synchronous Code Division Multiple Access (TD-SCDMA) transceiver 230 and a GSM/CDMA transceiver 240. Note the RATs of the cellular system radio transceivers shown in FIG. 2 are merely one of a plurality of embodiments, and the invention should not be limited thereto.

Most of the elements shown in FIG. 2 are the same as those shown in FIG. 1. Therefore, for the illustrations of the same elements, reference may be made to the paragraphs as discussed above for FIG. 1, and are omitted here for brevity. Different from FIG. 1, the communications apparatus 200 shown in FIG. 2 may further comprise a central control entity 255. The central control entity 255 is a logical entity physically implemented within the processor 250. Note that in some other embodiments of the invention, the central control entity 255 may also be integrated into the control entity of one cellular system radio transceiver. Therefore, the invention should not be limited to the structure shown in FIG. 2. Note further that, in order to clarify the concept of the invention, FIG. 2 presents a simplified block diagram in which only the elements relevant to the invention are shown. However, the invention should not be limited to what is shown in FIG. 2.

According to an embodiment of the invention, the communications apparatuses 100 and 200 may be a notebook, a cellular phone, a portable gaming device, a portable multi-media player, a Global Positioning System (GPS), a receiver, a personal digital assistant, a tablet computer, or another such device.

In the embodiments of the invention, either the central control entity 255 or the control entity (e.g. the control entity 113, 123, 133 or 143) comprised in each cellular system radio transceiver may collect the radio activity information from the co-located cellular system radio transceivers, determine whether interference will occur or is occurring when at least two cellular system radio transceivers are simultaneously performing TX/RX radio activities in two cellular networks and determine control information to mitigate the interference according to the collected radio activity information (which will be further discussed in the following paragraphs).

Figure 3:
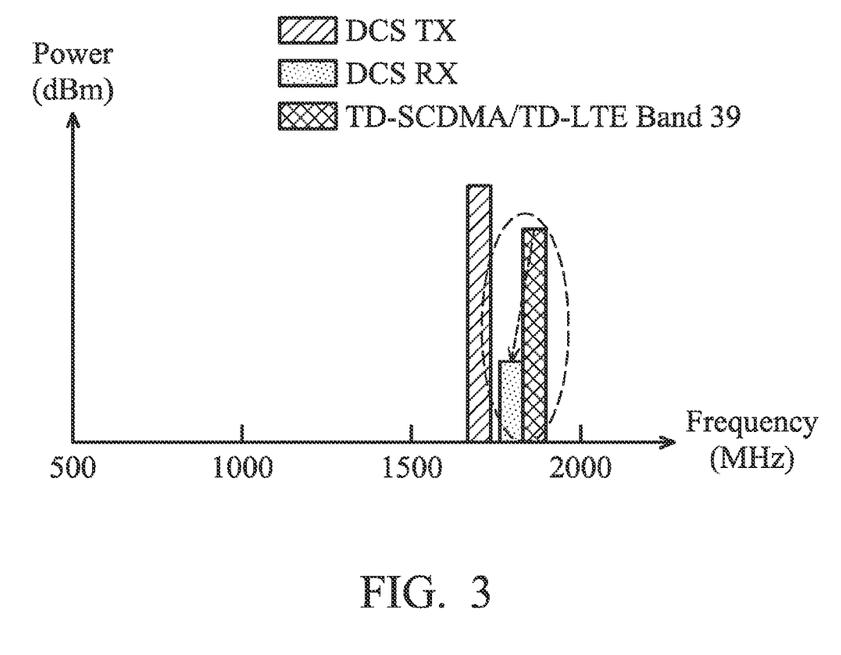
FIG. 3 is schematic frequency diagram showing an exemplary interference according to an embodiment of the invention.

FIG. 3 is schematic frequency diagram showing an exemplary interference according to an embodiment of the invention. As shown in FIG. 3, the GSM-1800 (that is, the digital cellular system (DCS)) uses 1,710-1,785 MHz for uplink transmission and 1,805-1,880 MHz for downlink reception. The TD-SCDMA and TD-LTE band 39 uses 1,880-1,920 MHz for both uplink transmission and downlink reception. Since there is no guard band between the TD-SCEMA/TD-LTE band 39 and the DCS RX band, interference will occur when the GSM/CDMA transceiver 140/240 performs RX radio activity in the 1,805-1,880 MHz band and the LTE/LTE-A transceiver 110/120/210/220 or the WCDMA/TD-SCDMA transceiver 130/230 performs TX radio activity in band 39 simultaneously. To be more specific, the TX RF signals of the LTE/LTE-A transceiver 110/120/210/220 or the WCDMA/TD-SCDMA transceiver 130/230 may be received by the GSM/CDMA transceiver 140/240, causing undesired interference to the RX RF signals of the GSM/CDMA transceiver 140/240.

However, when a communications apparatus (e.g. the communications apparatus 100/200) is equipped with at least two cellular system radio transceivers, the capability of simultaneous communications via two cellular system radio transceivers in two cellular networks is usually a basic requirement. Therefore, methods to mitigate the interference caused when performing simultaneous communications are proposed. Note that in the embodiments of the invention, the simultaneously communications may comprise voice service (for example, circuit-switched (CS) or IP multimedia subsystem (IMS)) and data service (for example, packet-switched (PS)) dual talk, voice service and voice service dual talk, and data service and data service dual talk. The invention should not be limited to either case.

According to an embodiment of the invention, a control entity (which can be either the central control entity 255 or the control entity 113, 123, 133 or 143 comprised in each cellular system radio transceiver) may collect radio activity information of the cellular system radio transceivers, determine whether interference will occur or is occurring and which cellular system radio transceiver is an aggressor transceiver and which cellular system radio transceiver is a victim transceiver when the interference occurs according to the radio activity information, and may further determine control information according to the radio activity information for controlling the aggressor transceiver or the victim transceiver, so as to mitigate the interference.

Note that in the embodiment, the aggressor transceiver is the cellular system radio transceiver having the transmitting radio activity that will interfere or interferes with the receiving radio activity of the victim transceiver. For example, in the scenario shown in FIG. 3, the LTE/LTE-A transceiver 110/120/210/220 or the WCDMA/TD-SCDMA transceiver 130/230 may be regarded as an aggressor transceiver and the GSM/CDMA transceiver 140/240 may be regarded as a victim transceiver when the GSM/CDMA transceiver 140/240 performs RX radio activity in the 1,805-1,880 MHz band and the LTE/LTE-A transceiver 110/120/210/220 or the WCDMA/TD-SCDMA transceiver 130/230 performs TX radio activity in band 39, simultaneously.

Figure 4:
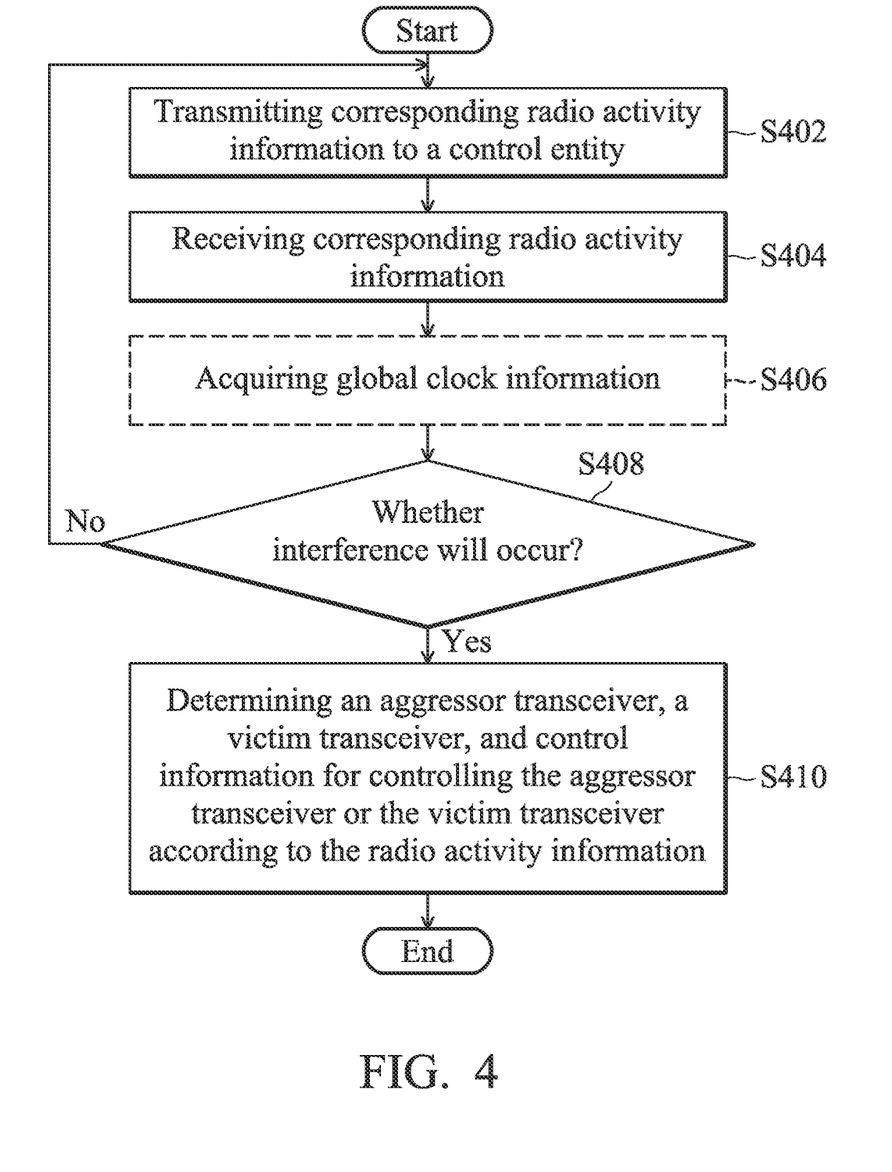
FIG. 4 is a schematic flow chart showing a method for mitigating interference occurred in a communications apparatus comprising at least two cellular system radio transceivers capable of simultaneously performing TX/RX radio activities in two cellular networks according to an embodiment of the invention.

FIG. 4 is a schematic flow chart showing a method for mitigating interference occurred in a communications apparatus comprising at least two cellular system radio transceivers capable of simultaneously performing TX/RX radio activities in two cellular networks according to an embodiment of the invention. First of all, the cellular system radio transceivers comprised in the communications apparatus may periodically or non-periodically transmit the corresponding radio activity information to a control entity (Step S402). Next, the control entity may receive the radio activity information from the corresponding cellular system radio transceivers (Step S404). As discussed above, the control entity receiving the radio activity information may be either the central control entity 255 or the control entity 113, 123, 133 or 143 comprised in each cellular system radio transceiver.

Note that in some embodiments, steps S402 and S404 may be combined into one step of periodically or non-periodically collecting radio activity information of the cellular system radio transceivers comprised in the communications apparatus, and the invention should not be limited thereto.

Next, the control entity with the collected radio activity information may acquire global clock information for performing timing synchronization between the radio activities of two cellular system radio transceivers (Step S406). Note that step S406 is an optional step and is performed when timing synchronization is required. Next, the control entity may determine whether interference will occur (or, is occurring) based on the collected radio activity information (Step S408). When the control entity determines that no interference will occur (or, occurs), the process may return to step S402. When the control entity determines that interference will occur (or, occurs), the control entity may further determine which cellular system radio transceiver is an aggressor transceiver, which cellular system radio transceiver is a victim transceiver, and control information for controlling the aggressor transceiver or the victim transceiver according to the radio activity information (Step S410), so as to mitigate the interference.

According to an embodiment of the invention, the radio activity information comprises a uplink/downlink operating frequency, bands, bandwidth of the corresponding cellular system radio transceiver, a service type of a communications service currently being provided or to be provided by the corresponding cellular system radio transceiver, a service status of the corresponding cellular system radio transceiver, a received signal strength or quality of the corresponding cellular system radio transceiver, a schedule of the transmitting/receiving radio activities of the corresponding cellular system radio transceiver, or any combinations thereof.

In an example, the control entity may determine whether interference will occur or is occurring according to uplink and downlink operating frequencies, bands, bandwidths of the corresponding cellular system radio transceivers. When there is no guard band, or the guard band between the uplink operating frequency/band and the downlink operating frequency/band is too small, or the RF filter cannot provide enough interference rejection, the control entity may determine that the interference will occur.

In another example, the control entity may determine a priority of the corresponding cellular system radio transceiver according to the service type of a communications service currently being provided or to be provided by the corresponding cellular system radio transceiver. Different service type may have different priorities. For example, the voice service may have higher priority than the data service. In order to avoid or mitigate the interference, the performance of a communications service having a lower priority may be sacrificed.

In yet another example, the control entity may further determine whether interference will occur or is occurring according to a service status of the corresponding cellular system radio transceiver. When one cellular system radio transceiver operates in an inactive state or an idle state, the control entity may determine that the interference will not occur since the cellular system radio transceiver does not communicate with the peer communications apparatus in the corresponding cellular network when operating in an inactive state and the cellular system radio transceiver has no or only a few TX radio activities when operating in an idle state.

In still another example, the control entity may determine the control information for controlling the aggressor transceiver or the victim transceiver according to the received signal strength or quality of the corresponding cellular system radio transceivers. Better received signal strength or quality usually implies that the victim transceiver can sustain more interference from the aggressor transceiver or the aggressor transceiver can reduce transmission power without causing disconnection.

In still another example, the control entity may determine the control information for controlling the aggressor transceiver or the victim transceiver according to a schedule of the TX/RX radio activities of the corresponding cellular system radio transceivers. When skipping or discarding one or more opportunities to perform the TX radio activity of the aggressor transceiver is required, the control entity may determine a preferred time to skip or discard the TX radio activity according to the TX schedule of the aggressor transceiver and the RX schedule of the victim transceiver. For example, when a TX radio activity of the aggressor transceiver collides with a RX radio activity of the victim transceiver, the control entity may direct the aggressor transceiver to skip or discard the collided radio activity.

According to an embodiment of the invention, the control entity may determine the control information according to the collected radio activity information as discussed above so as to control the aggressor transceiver to reduce transmission power utilized for performing its transmitting radio activity. According to another embodiment of the invention, the control entity may determine the control information according to the collected radio activity information as discussed above so as to control the aggressor transceiver to skip or discard one or more opportunities to perform its transmitting radio activity.

According to yet another embodiment of the invention, the control entity may determine the control information according to the collected radio activity information as discussed above so as to control the aggressor transceiver to perform a reselection procedure to automatically reselect to another frequency which has less or no interference and transmit a message to notify the corresponding cellular network of a capability change. The capability change may be, for example, the interfered frequency is not supported. Note that the reselection procedure is preferably performed in the idle state.

According to yet another embodiment of the invention, the control entity may determine the control information according to the collected radio activity information as discussed above so as to control the aggressor or victim transceiver to transmit a message during a call setup phase to notify the corresponding cellular network that a frequency or band in which the interference will occur is not supported. After notifying of not supporting a frequency or band in which the interference will occur, the corresponding cellular network will not handover the aggressor or victim transceiver back to the frequency or band.

According to still another embodiment of the invention, the control entity may determine the control information according to the collected radio activity information as discussed above so as to control the aggressor or victim transceiver to transmit a message, such as an interference indication message, to report the interference problem to the corresponding cellular network. For detailed illustrations of the interference indication message, reference may be made to the "In-device coexistence indication" in the specification 3GPP 36.331, v11.5.0, section 5.6.9 and the U.S. patent publication 2011/0312288 A1, entitled "System and method for coordinating multiple radio transceivers within the same device platform".

According to an embodiment of the invention, the control entity may determine the control information according to the collected radio activity information as discussed above so as to control the aggressor or victim transceiver to perform a reselection procedure to automatically reselect to another frequency and transmit a message to notify the corresponding cellular network of a capability change. The capability change may be, for example, the interfered frequency is not supported. Note that the reselection procedure is preferably performed in the idle state.

According to yet another embodiment of the invention, the control entity may determine the control information according to the collected radio activity information as discussed above so as to control the aggressor or victim transceiver to decrease a measurement report value of a frequency or band in which the interference will occur before reporting the measurement report value to the corresponding cellular network. In this manner, the corresponding cellular network will less likely handover the aggressor or victim transceiver to the frequency or band in which the interference will occur.

According to still another embodiment of the invention, the control entity may determine the control information according to the collected radio activity information as discussed above so as to control the victim transceiver to transmit a message, e.g. Channel Quality Indicator (CQI) to notify the corresponding cellular network to use a more robust modulation and coding scheme. In this manner, the received RF signals of the victim transceiver may be stronger to against the interference.

Table 1 shows an exemplary scenario of the collected radio activity information of two cellular system radio transceivers according to an embodiment of the invention.

| RAT | Aggressor or Victim | UL frequency | DL frequency | Service Type | Service Status | DL signal strength/quality |
|---|---|---|---|---|---|---|
| 4G | Aggressor | 1890 MHz | 1890 MHz | PS | Connected | RSRP = −80 dBm |
| 2G | Victim | 1775 MHz | 1870 MHz | CS | Dedicated | RSSI = −70 dBm |

In the scenario shown in Table 1, the 4G transceiver (e.g. the LTE/LTE-A transceiver 110, 120, 210 or 220) is an aggressor transceiver and the 2G transceiver (e.g. the GSM/CDMA transceiver 140 or 240) is a victim transceiver since there is not enough guard band between the 4G UL band and the 2G DL band (note that here, the UL frequency and DL frequency are represented by the center frequency). Because the CS service has a higher priority than the PS service, the control entity may determine to let the aggressor transceiver to scarify its performance to mitigate the interference.

The control entity may determine how to mitigate the interference (e.g. the control information) according to the DL signal strength/quality. Since in the scenario shown in Table 1, both the 2G and 4G have good DL signal strength/quality, the control entity may determine to reduce the transmission power of the aggressor transceiver. According to an embodiment of the invention, the control entity may determine the transmission power of the aggressor transceiver according to the UL/DL frequencies, the DL signal strength/quality and/or the UL/DL radio of the TDD configuration. For example, when the 4G transceiver's UL/DL radio is small, it means that the interference caused by the 4G transceiver is small.

In the embodiments of the invention, the control entity may direct to the aggressor transceiver to reduce its transmission power all the time, or may direct the aggressor transceiver to reduce its transmission power only when its TX radio activity collides with the RX radio activity of the victim transceiver. As discussed above, the control entity may acquire global clock information for performing timing synchronization between the radio activities of the aggressor and victim transceivers, and may determine when to direct the aggressor transceiver to reduce its transmission power. There are several methods to perform timing synchronization between different RATs known in the art, and the discussions are omitted here for brevity.

Table 2 shows another exemplary scenario of the collected radio activity information of two cellular system radio transceivers according to another embodiment of the invention.

| RAT | Aggressor or Victim | UL frequency | DL frequency | Service Type | Service Status | DL signal strength/quality |
|---|---|---|---|---|---|---|
| 4G | Aggressor | 1890 MHz | 1890 MHz | PS | Connected | RSRP = −110 dBm |
| 2G | Victim | 1775 MHz | 1870 MHz | CS | Dedicated | RSSI = −80 dBm |

Unlike the scenario shown in Table 1, in the scenario shown in Table 2, both the 2G and 4G have poor DL signal strength/quality. When both the 2G and 4G have poor DL signal strength/quality, reducing the transmission power of the aggressor transceiver may cause disconnection of the aggressor transceiver. Therefore, instead of reducing the transmission power of the aggressor transceiver, the control entity may direct to the aggressor transceiver to skip or discard one or more opportunities to perform its TX radio activity. As discussed above, the control entity may acquire the global clock information for performing timing synchronization between the radio activities of the aggressor and victim transceivers, and may determine when to direct the aggressor transceiver to skip or discard one or more opportunities to perform its TX radio activity. The control entity may direct the aggressor transceiver to only skip or discard the TX radio activities that collides with a RX radio activity of the victim transceiver.

Table 3 shows yet another exemplary scenario of the collected radio activity information of two cellular system radio transceivers according to yet another embodiment of the invention.

| RAT | Aggressor or Victim | UL frequency | DL frequency | Service Type | Service Status | DL signal strength/quality |
|---|---|---|---|---|---|---|
| 4G | Aggressor | 1890 MHz | 1890 MHz | PS | Idle | RSRP = −110 dBm |
| 2G | Victim | 1775 MHz | 1870 MHz | CS | Dedicated | RSSI = −80 dBm |

Different from the scenario shown in Table 2, in the scenario shown in Table 3, the aggressor transceiver operates in the idle state. Since the aggressor transceiver has no or only a few TX radio activities when it operates in the idle state, there is no need enable any protection mechanism.

Table 4 shows still another exemplary scenario of the collected radio activity information of two cellular system radio transceivers according to still another embodiment of the invention.

| RAT | Aggressor or Victim | UL frequency | DL frequency | Service Type | Service Status | DL signal strength/quality |
|---|---|---|---|---|---|---|
| 4G | Aggressor | 1890 MHz | 1890 MHz | PS | Connected | RSRP = −110 dBm |
| 2G | Victim | 1775 MHz | 1870 MHz | CS | Idle | RSSI = −80 dBm |

Different from the scenario shown in Table 2, in the scenario shown in Table 4, the victim transceiver operates in the idle state. When both the 2G and 4G have poor DL signal strength/quality, reducing the transmission power of the aggressor transceiver may cause disconnection of the aggressor transceiver. Therefore, instead of reducing the transmission power of the aggressor transceiver, the control entity may direct the aggressor transceiver to skip or discard one or more opportunities to perform its TX radio activity. On the other hand, since the victim transceiver operates in the idle state, instead of directing aggressor transceiver to skip or discard one or more opportunities to perform its TX radio activity, the control entity may also direct the victim transceiver to perform a reselection procedure to automatically reselect to another frequency, such as GSM 900 if supported, and transmit a message to notify the corresponding cellular network of a capability change. In this manner, the aggressor transceiver may not suffer performance degradation or disconnection.

Figure 5:
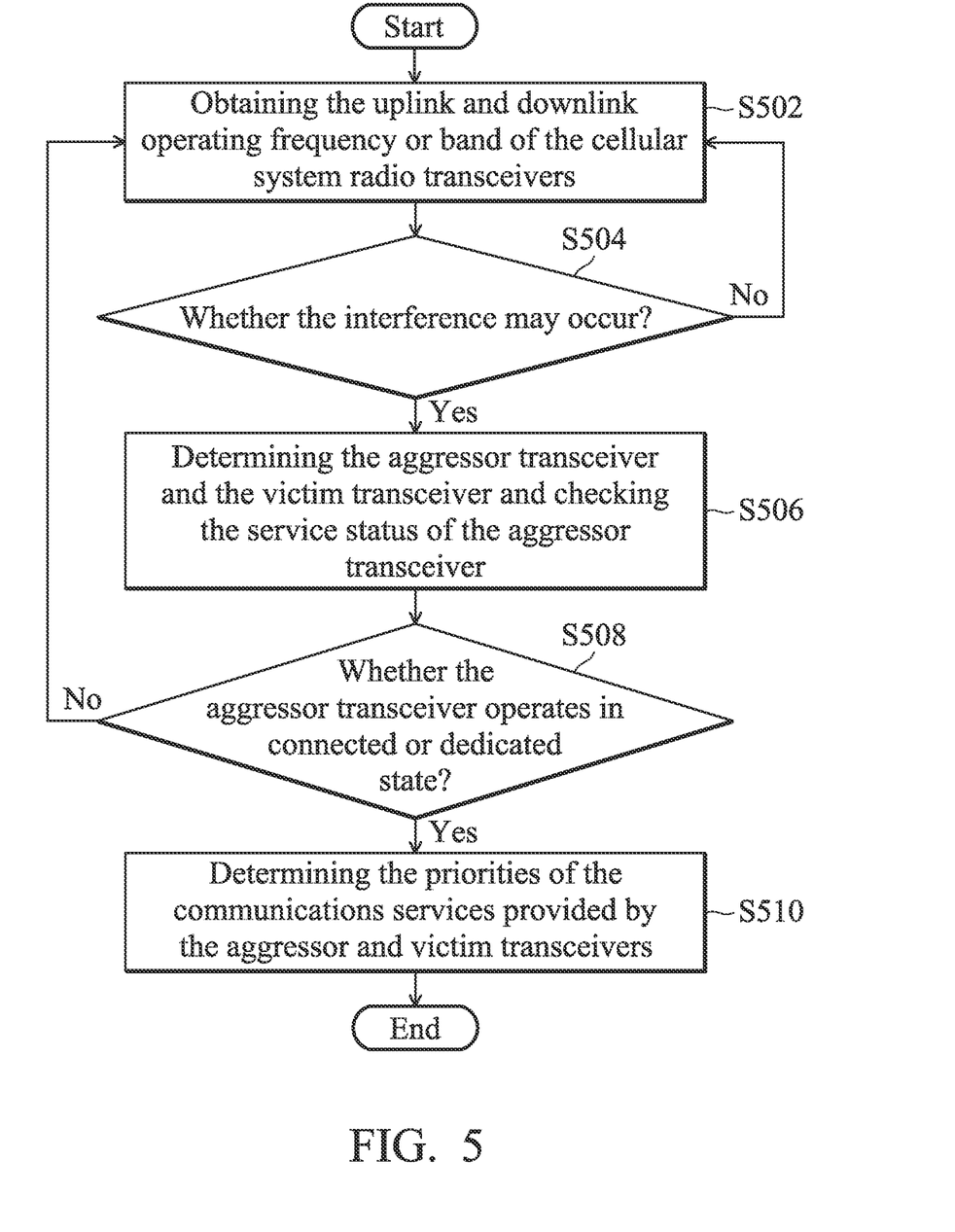
FIG. 5 is a flow chart of a method for determining whether interference will occur according to an embodiment of the invention.

FIG. 5 is an exemplary flow chart of a method for determining whether interference will occur according to an embodiment of the invention. First of all, the control entity may obtain the uplink and downlink operating frequency or band of the cellular system radio transceivers (Step S502). In the embodiment, step S502 may be performed periodically or non-periodically. Next, the control entity may determine whether the interference may occur (Step S504) due to the uplink operating frequency or band of one cellular system radio transceiver being too close to the downlink operating frequency or band of another cellular system radio transceiver. Here, the phrase "too close" means that there is not enough guard band for the RF filter comprised in the victim transceiver to adequately reject the interference from the aggressor transceiver. When the control entity determines that the interference may not occur based on the obtained the uplink and downlink operating frequency or band of the cellular system radio transceivers, the process may return to step S502 for the control entity to periodically or non-periodically collect the uplink and downlink operating frequency or band of the cellular system radio transceivers.

When the control entity determines that the interference may occur, the control entity may further determine which cellular system radio transceiver is an aggressor transceiver and which cellular system radio transceiver is a victim transceiver, and check the service status of the aggressor transceiver (Step S506). Next, the control entity may further determine whether the aggressor transceiver operates in connected or dedicated state (Step S508). If so, the control entity may determine that the interference will occur and may further determine the priorities of the communications services currently being provided or to be provided by the aggressor and victim transceivers (Step S510). If not, the process may return to step S502 for the control entity to periodically or non-periodically collect the uplink and downlink operating frequency or band of the cellular system radio transceivers since the interference may not occur when the aggressor transceiver operate in the idle state or in the inactive mode.

Figure 6:
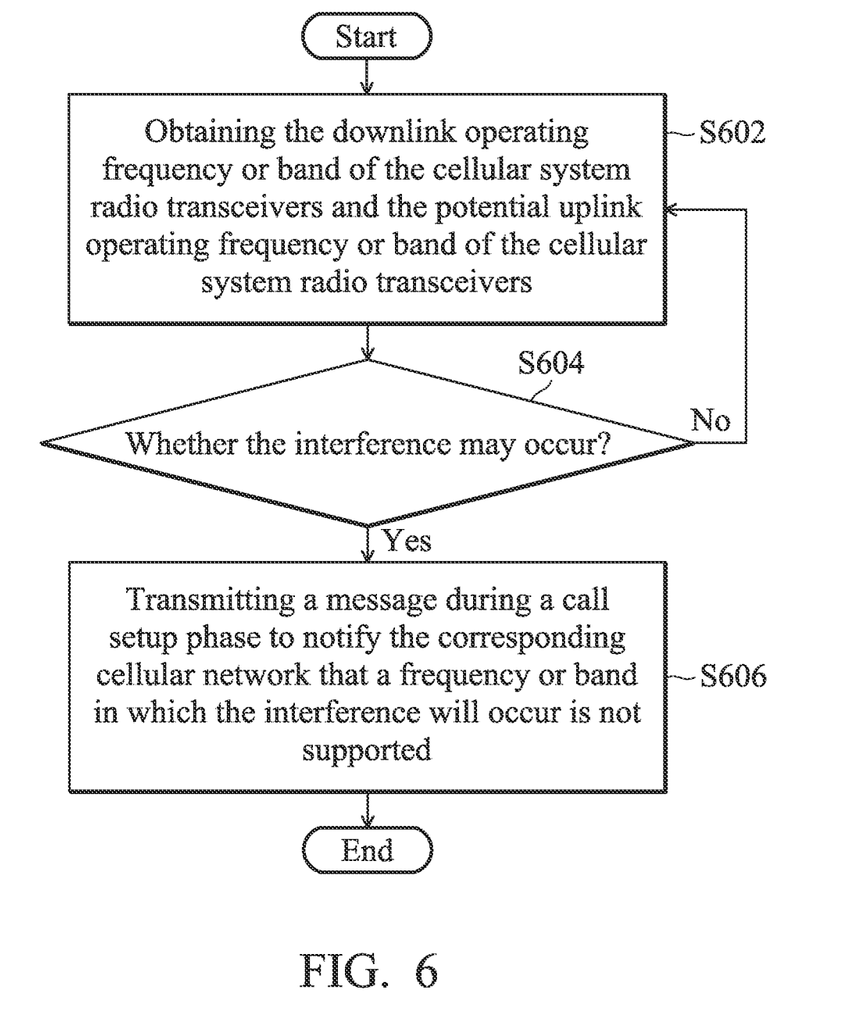
FIG. 6 is a flow chart of a method for determining whether interference may occur according to an embodiment of the invention.

FIG. 6 is an exemplary flow chart of a method for determining whether interference may occur according to an embodiment of the invention. First of all, the control entity may obtain the downlink operating frequency or band of the cellular system radio transceivers and the potential uplink operating frequency or band of the cellular system radio transceivers (Step S602). Note that unlike step S502, in step S602, the "potential" uplink operating frequency or band of the cellular system radio transceivers is checked. Since one cellular system radio transceiver may support multiple frequencies or bands of one RAT, even if the cellular system radio transceiver is not currently operating in an interfered operating frequency or band, the cellular system radio transceiver may still be handover to the interfered operating frequency or band in the future.

Next, the control entity may determine whether the interference may occur (Step S604) due to the potential uplink operating frequency or band of one cellular system radio transceiver being too close to the downlink operating frequency or band of another cellular system radio transceiver. When the control entity determines that the interference may not occur, the process may return to step S602.

When the control entity determines that the interference may occur, the control entity may control the potential victim transceiver to transmit a message during a call setup phase to notify the corresponding cellular network that a frequency or band in which the interference will occur is not supported (Step S606). After notifying of not supporting a frequency or band in which the interference will occur, the corresponding cellular network cellular network will not handover the victim transceiver to the frequency or band.

Figure 7:
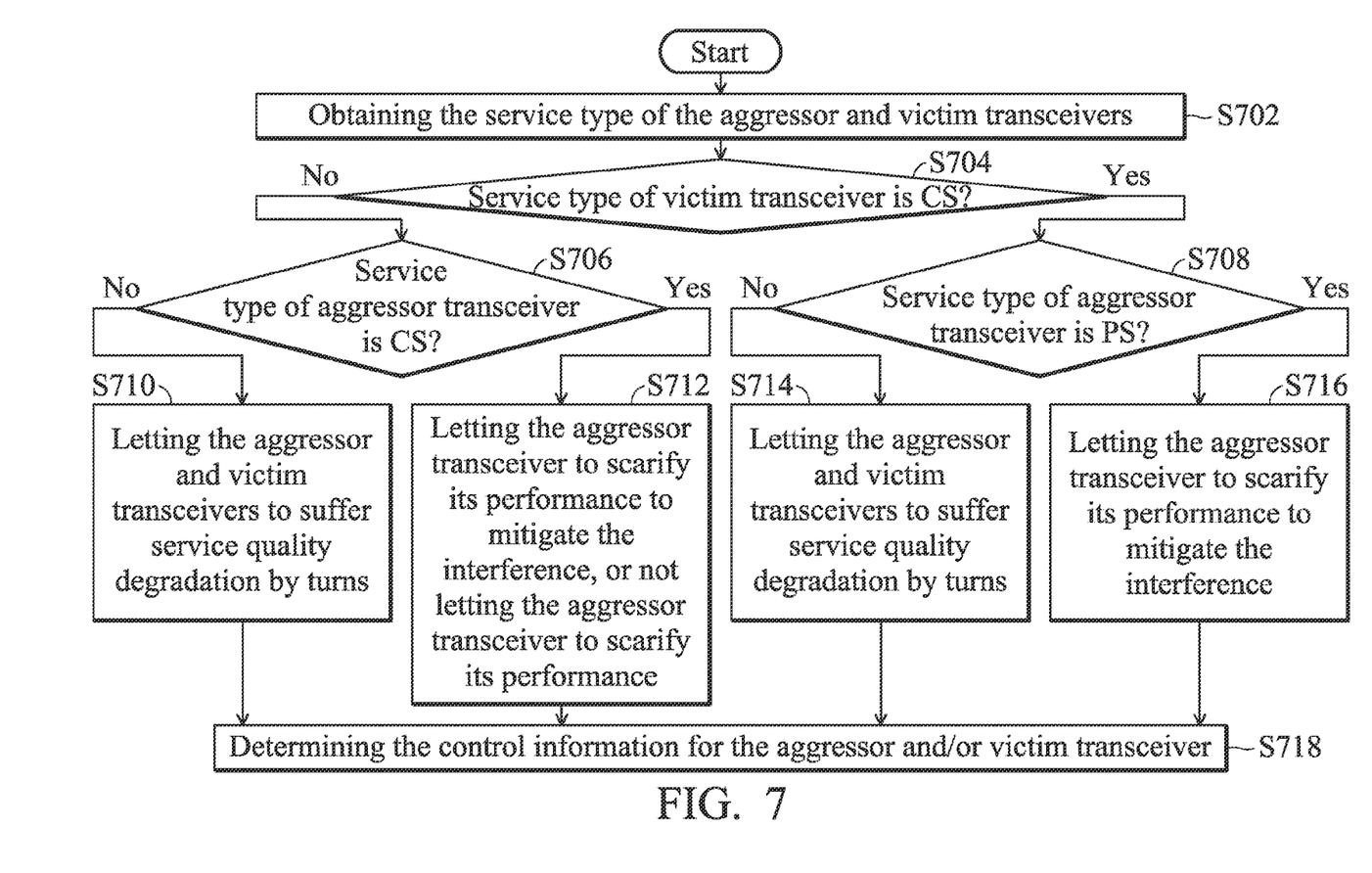
FIG. 7 is an exemplary flow chart of a method for determining the priorities of the communications services provided by the aggressor and victim transceivers according to an embodiment of the invention.

FIG. 7 is an exemplary flow chart of a method for determining the priorities of the communications services provided by the aggressor and victim transceivers according to an embodiment of the invention. First of all, the control entity may obtain the service type of the aggressor and victim transceivers (Step S702). Next, the control entity may determine whether the service type of victim transceiver is CS (Step S704). If not, the control entity may determine whether the service type of aggressor transceiver is CS (Step S706). If yes, the control entity may determine whether the service type of aggressor transceiver is PS (Step S708). When the service type of the aggressor and victim transceivers are both PS or both CS, the priorities of the communications services provided by the aggressor and victim transceivers are even. Therefore, the control entity may determine to let the aggressor and victim transceivers suffer service quality degradation by turn (Steps S710 and S714). To be more specific, the aggressor transceiver and the victim transceiver may take some actions or protection mechanisms as discussed above to scarify its performance to mitigate the interference by turns.

When the service type of the aggressor transceiver is PS and the service type of the victim transceiver is CS, since PS has a lower priority than CS, the control entity may determine to let the aggressor transceiver to scarify its performance to mitigate the interference (Step S716). When the service type of the aggressor transceiver is CS and the service type of the victim transceiver is PS, since CS has a higher priority than PS, the control entity may determine to let the aggressor transceiver to scarify its performance to mitigate the interference, or determine not to let the aggressor transceiver to scarify its performance (Step S712).

Finally, the control entity may determine how to do to mitigate the interference. That is, the control entity may determine the control information for the aggressor and/or victim transceiver (Step S718).

Figure 8:
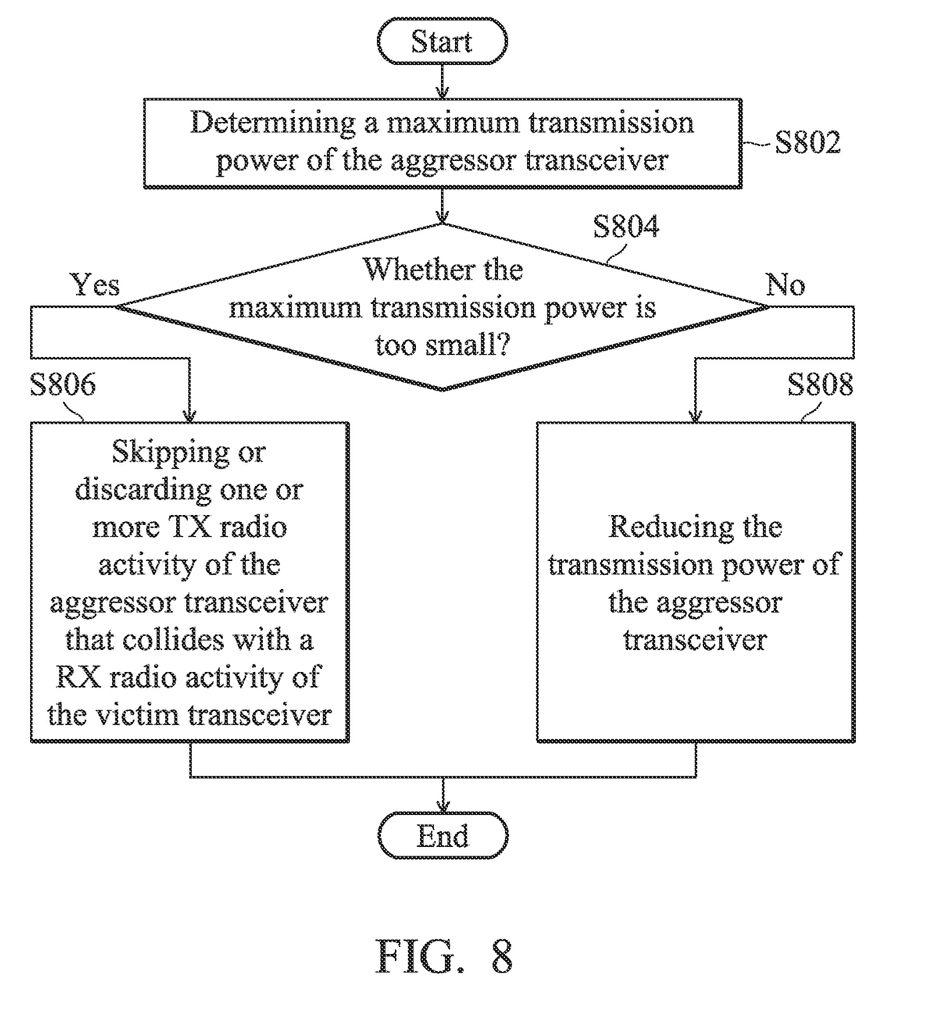
FIG. 8 is an exemplary flow chart of a method for determining the control information for the aggressor transceiver according to an embodiment of the invention.

FIG. 8 is an exemplary flow chart of a method for determining the control information for the aggressor transceiver according to an embodiment of the invention. First of all, the control entity may determine a maximum transmission power of the aggressor transceiver (Step S802). According to an embodiment of the invention, the control entity may determine the maximum transmission power of the aggressor transceiver according to the operating frequency or band of the victim transceiver, the received signal strength or quality of the aggressor and victim transceivers, the data reception pattern of the aggressor and victim transceivers, and the TDD configuration of the aggressor transceiver. Next, the control entity may determine whether the maximum transmission power determined in step S802 is too small (Step S804) to cause the aggressor transceiver to be disconnected from the cellular network. When the maximum transmission power determined in step S802 is too small, the control entity may determine the control information to control the aggressor transceiver to skip or discard one or more TX radio activity that collides with a RX radio activity of the victim transceiver (Step S806). When the maximum transmission power determined in step S802 is not too small, the control entity may determine the control information to control the aggressor transceiver to reduce the transmission power (Step S808). In this manner, simultaneously transmitting and receiving of the aggressor transceiver and the victim transceiver is still allowed. Note that in some embodiments of the invention, the control entity may control the aggressor transceiver to reduce the transmission power only in the TX radio activity that collides with a RX radio activity of the victim transceiver.

Figure 9:
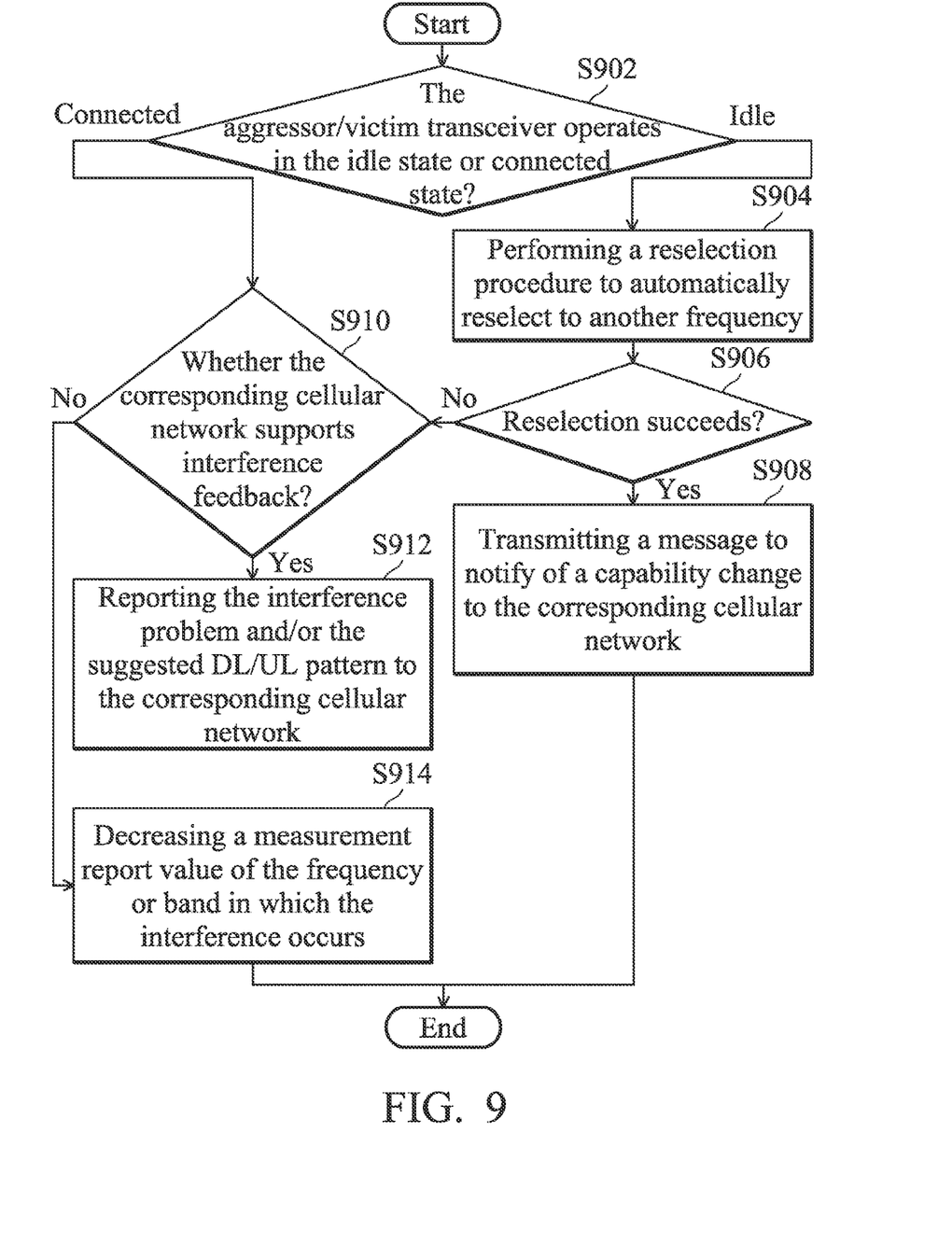
FIG. 9 is an exemplary flow chart of a method for determining the control information for the aggressor or victim transceiver according to an embodiment of the invention.

FIG. 9 is an exemplary flow chart of a method for determining the control information for the aggressor or victim transceiver according to an embodiment of the invention. The control entity may first determine whether the aggressor/victim transceiver operates in the idle state or the connected state (Step S902). When the aggressor/victim transceiver operates in the idle state, the control entity may control the aggressor/victim transceiver to perform a reselection procedure to automatically reselect to another frequency (Step S904). When the reselection succeeds (the yes path for Step S906), the control entity may control the aggressor/victim transceiver to transmit a message to notify the corresponding cellular network of a capability change (Step S908). For example, the aggressor/victim transceiver may disable some supported frequency or band that may cause interference or may be interfered with by other cellular system radio transceiver.

When the aggressor/victim transceiver operates in the connected state, or when the reselection does not succeed, the control entity may further determine whether the corresponding cellular network of the aggressor/victim transceiver supports interference feedback (Step S910). In an embodiment of the invention, the interference feedback may be the "In-device coexistence indication" as discussed above. When the corresponding cellular network supports interference feedback, the aggressor/victim transceiver may transmit a message to report the interference problem and/or the suggested DL/UL pattern to the corresponding cellular network (Step S912). When the corresponding cellular network does not support interference feedback, the aggressor/victim transceiver may decrease a measurement report value of the frequency or band in which the interference occurs (or will occur) (Step S914), so as to let the corresponding cellular network command the aggressor/victim transceiver to leave the frequency or band.

According to an embodiment of the invention, the control entity may control the aggressor transceiver and/or the victim transceiver to perform the actions or protection mechanisms as discussed above to mitigate the interference via software control or hardware control. Taking the action of skipping or discarding one or more opportunities to perform the TX radio activity as an example, the control entity may control the aggressor transceiver via software control, such that the software module of the aggressor transceiver does not schedule the TX radio activity that will collide with a RX radio activity of the victim transceiver. On the other hand, the control entity may also control the aggressor transceiver via hardware control, such that the aggressor transceiver may directly turn off one or more hardware devices at the time when collision occurs, so as to skip or discard the opportunity to perform the TX radio activity. The control entity (which can be either the central control entity 255 or the control entity 113, 123, 133 or 143 comprised in each cellular system radio transceiver) may control the aggressor transceiver via a hardware interface connected therebetween. Therefore, in the embodiments of the invention, the radio activity information and the control information may be exchanged or transmitted between the control entities of the cellular system radio transceivers as shown in FIG. 1, or may be exchanged or transmitted between the control entities of the cellular system radio transceivers and the central control entity 255 as shown in FIG. 2. Note that the invention should not be limited to either case.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   at least two cellular system radio transceivers, capable of simultaneously performing transmitting/receiving radio activities in at least two cellular networks; and
   a control entity, coupled to the cellular system radio transceivers, collecting radio activity information of the cellular system radio transceivers, determining whether interference will occur or is occurring and which cellular system radio transceiver is an aggressor transceiver and which cellular system radio transceiver is a victim transceiver when the interference occurs according to the radio activity information, and further determining control information according to the radio activity information for controlling the aggressor transceiver or the victim transceiver to mitigate the interference, wherein the aggressor transceiver is the cellular system radio transceiver having the transmitting radio activity that will interfere or interferes with the receiving radio activity of the victim transceiver, and wherein based on the control information, the victim transceiver decreases a measurement report value of a frequency or band in which the interference will occur before reporting the measurement report value to the corresponding cellular network.

2. The communications apparatus as claimed in claim 1, wherein the control entity is integrated into one of the cellular system radio transceivers.

3. The communications apparatus as claimed in claim 1, wherein the radio activity information comprises a uplink/downlink operating frequency, bands, and bandwidth of the corresponding cellular system radio transceiver, a service type of a communications service currently being provided or to be provided by the corresponding cellular system radio transceiver, a service status of the corresponding cellular system radio transceiver, a received signal strength or quality of the corresponding cellular system radio transceiver, a schedule of the transmitting/receiving radio activities of the corresponding cellular system radio transceiver, Packet Error Rate (PER), or any combination thereof.

4. The communications apparatus as claimed in claim 1, wherein based on the control information, the aggressor transceiver reduces transmission power utilized for performing its transmitting radio activity.

5. The communications apparatus as claimed in claim 1, wherein based on the control information, the aggressor transceiver skips or discards one or more opportunities to perform its transmitting radio activity.

6. The communications apparatus as claimed in claim 1, wherein based on the control information, the aggressor transceiver performs a reselection procedure to automatically reselect to another frequency and transmits a message to notify the corresponding cellular network of a capability change.

7. The communications apparatus as claimed in claim 1, wherein based on the control information, the aggressor transceiver transmits a message during a call setup phase to notify the corresponding cellular network that a frequency or band in which the interference will occur is not supported.

8. The communications apparatus as claimed in claim 1, wherein based on the control information, the aggressor transceiver transmits a message to report the interference problem to the corresponding cellular network.

9. The communications apparatus as claimed in claim 1, wherein based on the control information, the victim transceiver performs a reselection procedure to automatically reselect to another frequency and transmits a message to notify the corresponding cellular network of a capability change.

10. The communications apparatus as claimed in claim 1, wherein based on the control information, the victim transceiver transmits a message during a call setup phase to notify the corresponding cellular network that a frequency or band in which the interference will occur is not supported.

11. The communications apparatus as claimed in claim 1, wherein based on the control information, the aggressor transceiver decreases a measurement report value of a frequency or band in which the interference will occur before reporting the measurement report value to the corresponding cellular network.

12. The communications apparatus as claimed in claim 1, wherein based on the control information, the victim transceiver transmits a message to notify the corresponding cellular network to use a more robust modulation and coding scheme.

13. The communications apparatus as claimed in claim 1, wherein based on the control information, the victim transceiver transmits a message to report the interference problem to the corresponding cellular network.

14. A method for mitigating interference occurring in a communications apparatus comprising at least two cellular system radio transceivers capable of simultaneously performing transmitting/receiving radio activities in two cellular networks, comprising:

collecting radio activity information of the cellular system radio transceivers;

determining whether interference will occur or is occurring and which cellular system radio transceiver is an aggressor transceiver and which cellular system radio transceiver is a victim transceiver when the interference occurs according to the radio activity information;

determining control information according to the radio activity information for controlling the aggressor transceiver or the victim transceiver to mitigate the interference; and decreasing a measurement report value of a frequency or band in which the interference will occur based on the control information before reporting the measurement report value to the corresponding cellular network by the aggressor or victim transceiver, wherein the aggressor transceiver is the cellular system radio transceiver having the transmitting radio activity that will interfere or interferes with the receiving radio activity of the victim transceiver.

15. The method as claimed in claim 14, wherein the radio activity information comprises a uplink/downlink operating frequency, bands, bandwidth of the corresponding cellular system radio transceiver, a service type of a communications service currently being provided or to be provided by the corresponding cellular system radio transceiver, a service status of the corresponding cellular system radio transceiver, a received signal strength or quality of the corresponding cellular system radio transceiver, a schedule of the transmitting/receiving radio activities of the corresponding cellular system radio transceiver, Packet Error Rate (PER), or any combinations thereof.

16. The method as claimed in claim 14, further comprising:

reducing transmission power utilized by the aggressor transceiver for performing its transmitting radio activity.

17. The method as claimed in claim 14, further comprising:

skipping or discarding one or more opportunities for performing the transmitting radio activity by the aggressor transceiver.

18. The method as claimed in claim 14, further comprising:

performing a reselection procedure to automatically reselect to another frequency and transmitting a message to notify the corresponding cellular network of a capability change by the aggressor transceiver.

19. The method as claimed in claim 14, further comprising:
   transmitting a message during a call setup phase to notify the corresponding cellular network that a frequency or band in which the interference will occur is not supported by the aggressor transceiver.

20. The method as claimed in claim 14, further comprising:
   transmitting a message to report the interference problem to the corresponding cellular network by the aggressor or victim transceiver.

21. The method as claimed in claim 14, further comprising:
   performing a reselection procedure to automatically reselect to another frequency and transmitting a message to notify the corresponding cellular network of a capability change by the victim transceiver.

22. The method as claimed in claim 14, further comprising:
   transmitting a message during a call setup phase to notify the corresponding cellular network that a frequency or band in which the interference will occur is not supported by the victim transceiver.

23. The method as claimed in claim 14, further comprising:
   transmitting a message to notify the corresponding cellular network to use a more robust modulation and coding scheme by the victim transceiver.

* * * * *